(12) United States Patent
Mori (10) Patent No.: US 9,383,949 B2
(45) Date of Patent: Jul. 5, 2016

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Namihiro Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/593,828

(22) Filed: Jan. 9, 2015

(65) Prior Publication Data

US 2015/0199153 A1    Jul. 16, 2015

(30) Foreign Application Priority Data

Jan. 10, 2014    (JP) ................................. 2014-003357

(51) Int. Cl.
*G06F 3/12*    (2006.01)
*G06F 9/54*    (2006.01)

(52) U.S. Cl.
CPC ............ *G06F 3/1205* (2013.01); *G06F 3/1275* (2013.01); *G06F 3/1285* (2013.01); *G06F 9/542* (2013.01)

(58) Field of Classification Search
USPC ....................................................... 358/1.15
See application file for complete search history.

(56) References Cited

U.S. PATENT DOCUMENTS

| 8,970,856 B2* | 3/2015 | Tohki ................... G03G 15/502 345/501 |
| 2007/0091381 A1* | 4/2007 | Sato ................... H04N 1/00326 358/448 |
| 2007/0236708 A1* | 10/2007 | Jahn ....................... G06Q 10/06 358/1.6 |
| 2009/0225348 A1* | 9/2009 | Miyake .............. G03G 15/5004 358/1.14 |
| 2014/0356103 A1* | 12/2014 | Oki ......................... B42C 13/00 412/1 |

FOREIGN PATENT DOCUMENTS

JP    2000-224169 A    8/2000

* cited by examiner

*Primary Examiner* — Ngon Nguyen
(74) *Attorney, Agent, or Firm* — Canon USA, Inc. IP Division (57) ABSTRACT

An information processing apparatus includes a providing unit, a management unit, an input unit, and a notification control unit. The providing unit provides at least a first screen and a second screen from an application. The management unit manages the first screen as a screen for forced notification. The input unit inputs information to be displayed in a screen. In a case where the second screen is in an active state, the notification control unit notifies both of the first screen and the second screen of the information. In a case where the second screen is in an inactive state, the notification control unit notifies the first screen of the information and does not notify the second screen of the information.

18 Claims, 9 Drawing Sheets

| | |
|---|---|
| 41 | SCREEN ID |
| 42 | SCREEN NAME |
| 43 | EVENT DETAIL |
| 44 | FORCED NOTIFICATION NECESSITY |

FIG. 5

| LIST NUMBER | SCREEN ID | SCREEN NAME |
|---|---|---|
| 1 | 002 | REPRINT SCREEN |
| 2 | 004 | SHIPMENT COMPLETION SCREEN |
| 3 | 001 | COLLATION SCREEN |
| 4 | 003 | INSPECTION OK REGISTRATION SCREEN |

… 
INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus, an information processing method, and a storage medium and, in particular, is suitable for use in controlling the display of a screen provided by an application.

2. Description of the Related Art

In the field of print-on-demand (POD), there is a need for producing various types of products that are finished differently depending on clients. To manage what print document is a product of what client, what print document should be finished in what way, and the like, there have been established workflows using barcodes printed on print documents. In this case, a barcode indicating an identifier that is different for each product is printed on a print document. Then, the barcode is read with a barcode reader, and the read barcode information is sent to an information processing apparatus in which an application that uses barcode information is installed. In this way, which print document a workflow is to be executed on, which parameter is to be applied, and the like can automatically be determined. As a result, the operation efficiency can be increased compared with manual workflows.

The application that uses barcode information has a function of displaying, on a screen that manages workflows, the barcode information read by the barcode reader, a parameter corresponding to the barcode information, and the like. The application also has a function of searching, based on the read barcode information, for a product that corresponds to the identifier indicated by the barcode information, and executing a desired workflow. Since a workflow includes multiple steps, the application provides multiple screens for respective function units of the workflow. In the foregoing configuration, since barcodes to be read have the same system, the application needs to control, at the time when the barcode information is input, which workflow should be executed, that is, to which screen barcode information should be sent.

Japanese Patent Application Laid-Open No. 2000-224169 discusses a technique for controlling data from an input apparatus by an application providing multiple screens. Japanese Patent Application Laid-Open No. 2000-224169 discusses distributing information received from an input/output apparatus to all screens registered in a screen list so as to uniformly manage the information and maintain the consistency of information.

According to the technique discussed in Japanese Patent Application Laid-Open No. 2000-224169, notification of the information is provided to all screens. Thus, in the use case described above, information displayed on a screen may be inconsistent with what should be executed. For example, when multiple screens having functions regarding multiple steps that cannot be executed simultaneously are activated, if notification of information is provided to all of the multiple screens, an operation that is not intended by a user may be executed. For example, all the functions regarding the multiple steps may be executed. Furthermore, the user may become unable to easily determine which function is to be executed.

SUMMARY OF THE INVENTION

The present invention is directed to a technique for displaying input information on a screen that should display the input information among multiple screens provided by an application. For example, if barcode information is input while multiple screens are activated, notification of the information is provided to a screen registered at the top of a normal notification list and all screens registered in a forced notification list, regardless of whether the screens are active.

According to an aspect of the present invention, an information processing apparatus includes a providing unit configured to provide at least a first screen and a second screen from an application, a management unit configured to manage the first screen as a screen for forced notification, an input unit configured to input information to be displayed in a screen, and a notification control unit configured, in a case where the second screen is in an active state, to notify both of the first screen and the second screen of the information and, in a case where the second screen is in an inactive state, to notify the first screen of the information and not to notify the second screen of the information.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

The following will describe a first exemplary embodiment.

Figure 1:
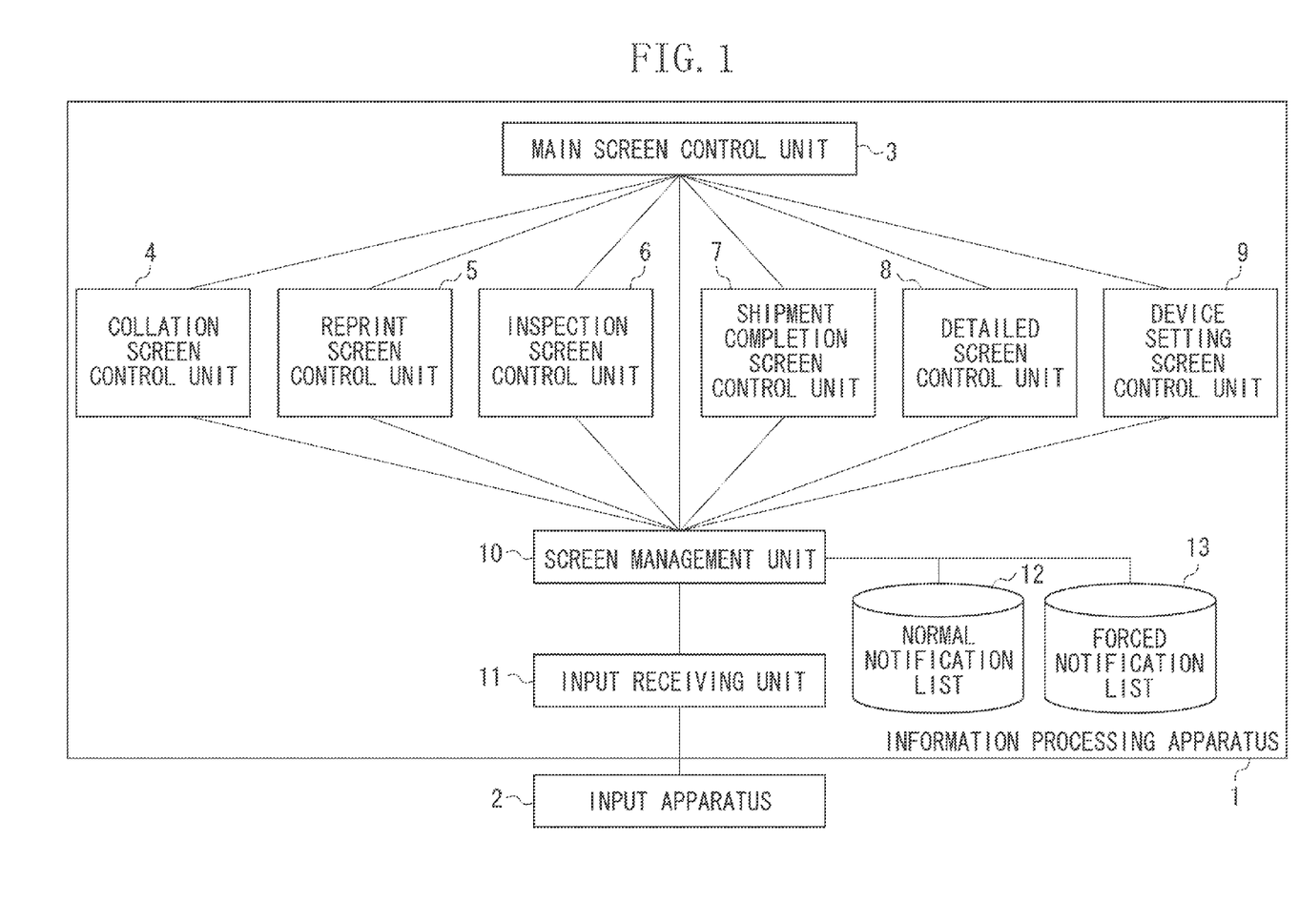
FIG. 1 illustrates a configuration of a workflow management system.

FIG. 1 illustrates an example of the configuration of a workflow management system.

The workflow management system includes an information processing apparatus 1 and an input apparatus 2.

The information processing apparatus 1 is an execution apparatus for mainly executing each function in a production workflow. The production workflow refers to a series of flows of steps required for the production of a product ordered by a client. In the present exemplary embodiment, the information processing apparatus 1 mainly executes steps that are triggered by input of barcode information from the input apparatus 2, such as a collation step, a reprint step, an inspection step, and a shipment completion registration step, among the multiple steps included in the production workflow.

The input apparatus 2 is an apparatus for a user inputting information. Information that is input from the input apparatus 2 is sent to the information processing apparatus 1 via an interface. In the present exemplary embodiment, a case where the input apparatus 2 is a barcode reader will be described as an example. In this case, the input apparatus 2 inputs information of a barcode printed on a print document (sheet), and sends the information to the information processing apparatus 1.

The input apparatus 2 is not limited to a barcode reader. The input apparatus 2 may be an apparatus configured to optically read coded information printed on a print document, such as a Quick Response (QR) code (registered trademark) reader. For example, an apparatus configured to input information with a keyboard or a near field communication (NFC) reader can be used as the input apparatus 2.

The information processing apparatus 1 includes multiple modules. First, the information processing apparatus 1 includes, as screen control units (notification control units configured to control notification of barcode information to screens), a main screen control unit 3, a collation screen control unit 4, a reprint screen control unit 5, an inspection screen control unit 6, a shipment completion screen control unit 7, a detailed screen control unit 8, and a device setting screen control unit 9. Each of the foregoing screen control units includes a graphical user interface (GUI) and a control unit configured to control the GUI. The main screen control unit 3 controls a portal screen (main screen) that is displayed when an application (application program) is activated. The user can activate the other respective screens by operating the main screen. Details of each screen will be described below with reference to FIG. 3 and the like.

The information processing apparatus 1 further includes a screen management unit 10 and an input receiving unit 11.

The screen management unit 10 has a function of managing the respective screens. Specifically, the screen management unit 10 has functions of receiving an operation event and managing the states of the screens. Examples of an operation event include an event that a screen becomes active, is closed, or the like, in response to a user operation. The screen management unit 10 also has functions of acquiring via the input receiving unit 11 information input from the input apparatus 2, and providing notification of the information to the respective screen control units according to the states of the screens.

The screen management unit 10 manages two lists, a normal notification list 12 and a forced notification list 13. The forced notification list 13 is a list for managing a screen that constantly displays barcode information regardless of the state of the screen. The normal notification list 12 is a list for managing a screen that displays barcode information only in a case where the screen is in an active state. Details of the lists will be described below with reference to FIG. 5 and the like.

As described above, in the present exemplary embodiment, a screen that constantly displays barcode information regardless of the state of the screen is an example of a screen for forced notification, whereas a screen that displays barcode information only in a case where the screen is in an active state is an example of a screen for non-forced notification. Further, the management using the forced notification list 13 is an example of a first management, whereas the management using the normal notification list 12 is an example of a second management.

The input receiving unit 11 has a function of receiving barcode information from the input apparatus 2. The input receiving unit 11 notifies the screen management unit 10 of the received information. As described below, at least a part of the barcode information is displayed in a screen.

Figure 2:
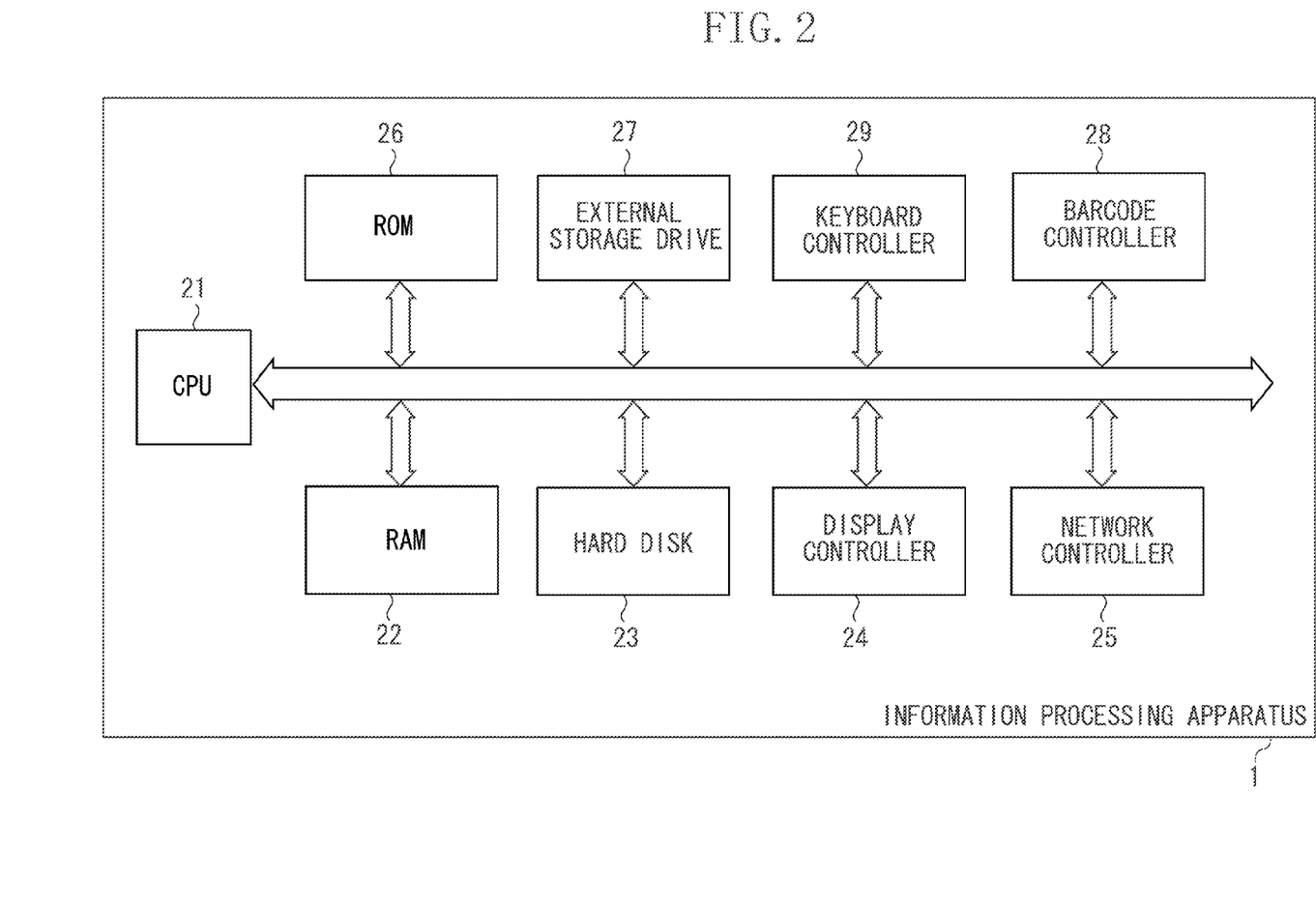
FIG. 2 illustrates a hardware configuration of an information processing apparatus.

FIG. 2 illustrates an example of the hardware configuration of the information processing apparatus 1.

A central processing unit (CPU) 21 executes a program stored in a program area in a read-only memory (ROM) 26, or a program such as an operating system (OS) or an application that is loaded from a hard disk 23 into a random-access memory (RAM) 22. The RAM 22 functions as a main memory, a work area, and the like of the CPU 21. The hard disk 23 stores a boot program, various types of applications, font data, user files, electronic document files, and the like. A program for the execution of processing described in the present exemplary embodiment is stored in, for example, the hard disk 23 of the information processing apparatus 1, loaded into the RAM 22, and executed by the CPU 21. A display controller 24 controls the display performed by a display. A network controller 25 executes communication control processing for controlling communication with other devices connected to a network. An external storage drive 27 executes communication control processing for controlling communication with an external portable storage medium. A barcode controller 28 executes communication control processing for controlling communication with the input apparatus 2 (barcode reader) connected to the information processing apparatus 1. A keyboard controller 29 executes communication control processing for controlling communication with a keyboard, mouse, and the like that are connected to the information processing apparatus 1.

Figure 3:
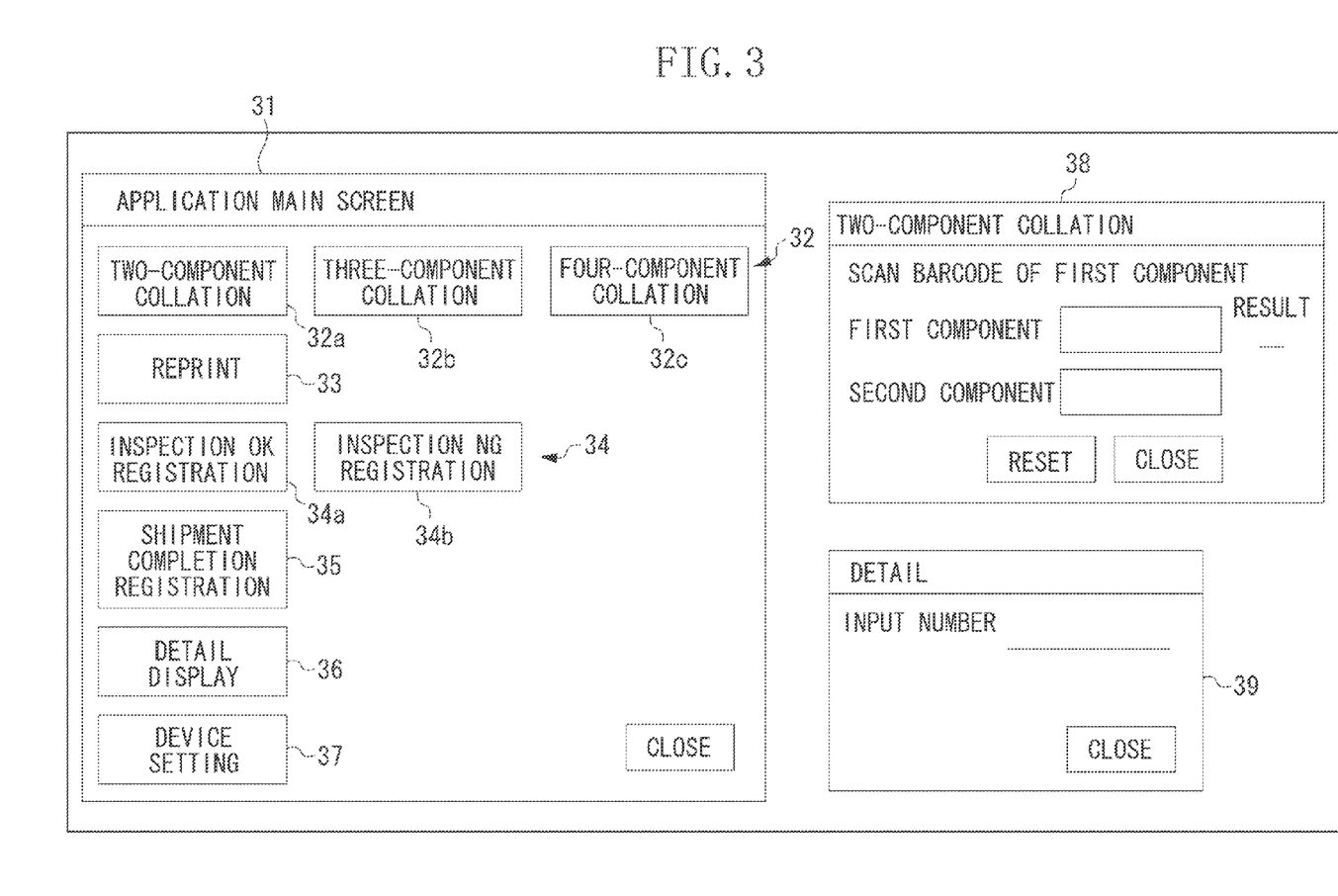
FIG. 3 illustrates a first example of a state of a user interface of an information processing apparatus.

FIG. 3 illustrates an example of the state of a user interface of the information processing apparatus 1.

A main screen (an application main screen) 31 is an example of a screen (user interface) controlled by the main screen control unit 3. The main screen 31 is provided from an application at the time of activation of the application and displayed on a display apparatus. The main screen 31 includes a collation button 32, a reprint button 33, an inspection button 34, a shipment completion button 35, a detail button 36, and a device setting button 37. Each of the foregoing buttons includes at least one button. Upon the press of the collation button 32, the reprint button 33, the inspection button 34, the shipment completion button 35, the detail button 36, and the device setting button 37, a collation screen, a reprint screen, an inspection screen, a shipment completion screen, a detailed screen, and a device setting screen are respectively provided by the application, that is, the collation screen, the reprint screen, the inspection screen, the shipment completion screen, the detailed screen, and the device setting screen are respectively activated. The configuration of the buttons may be changed according to the purpose of use of the user, by editing setting information prior to the activation of the application.

The collation button 32 is a button for activating the collation screen. The collation screen is a screen having a function of collating products. The collation refers to the verification of whether components of a product including multiple components such as a front cover and text body are components of the same product. Whether components are of the same product is determined based on whether barcodes printed on print documents of the respective components are the same. The number of collation components (number of components to be collated) varies depending on the configuration of the product. In the example illustrated in FIG. 3, the collation button 32 includes a two-component collation button 32a, a three-component collation button 32b, and a four-component collation button 32c. The two-component collation button 32a is a button for activating a two-component collation screen for conducting two-component collation. The three-component collation button 32b is a button for activating a three-component collation screen for conducting three-component collation. The four-component collation button 32c is a button for activating a four-component collation screen for conducting four-component collation. As the foregoing describes, the collation button 32 and the collation screen of an application can be constituted by multiple collation buttons and multiple collation screens, respectively.

The reprint button 33 is a button for activating the reprint screen. The reprint screen is a screen having a function of reprinting a product identified by input barcode information. In a case where production fails in a printing or post-processing step, or in other similar cases, the process needs to be conducted again from the printing. Barcode information printed on a print document that is defectively produced or the like is read, and based on the read information, the reprint screen displays information about a print document that needs to be reprinted. This realizes a mechanism for enabling an operator to reprint a target product without taking time to search for the target product from a system.

The inspection button 34 is a button for activating the inspection screen. The inspection screen is a screen having a function of registering product inspection results by use of barcodes. In POD production site, in some cases, which product is determined as a defective product and the number of defective products are registered in a system at the time of the product inspection, for the purpose of managing costs and recognizing reprint targets. The function of the inspection screen can be used in the registration, and the inspection button 34 includes two buttons, an inspection OK registration button 34a and an inspection NG registration button 34b. The inspection OK registration button 34a is a button for activating an inspection screen (inspection NG registration screen) for registering a product that is not determined as a defective product during the production. The inspection NG registration button 34b is a button for activating an inspection screen (inspection OK registration screen) for registering a product that is determined as a defective product during the production.

The shipment completion button 35 is a button for activating the shipment completion screen. The shipment completion screen is a screen that has a function of registering in the system the completion of shipment of a group of products to a shipping address by use of a barcode. The completion of shipment is registered so that notification of the shipment can be provided to a client that placed the order and notification of the status can be provided to an order management server. The function of the shipment completion screen enables automatic management of the completion of production. According to the function of the shipment completion screen, for example, barcode information printed on a print document to be shipped is read, and based on the read barcode information, information about a product the shipment of which is to be completed is displayed on the shipment completion screen, whereby the foregoing use case can be executed.

The detail button 36 is a button for activating the detailed screen. The detailed screen is a screen for displaying detailed information about barcode information input from the input apparatus 2. For example, the detailed screen displays detailed information such as an identifier of a product indicated by the read barcode information, and which component the read barcode information is about. From the displayed information, an operator can check whether the operator has read a barcode of a right object, and the like. The device setting button 37 is a button for activating the device setting screen. The device setting screen has a function of browsing and setting a device that is to undergo the execution among the devices registered in the workflow system.

In the example illustrated in FIG. 3, a case where a collation screen 38 and a detailed screen 39 are displayed in parallel with the main screen 31 will be described as an example. As illustrated in FIG. 3, after multiple screens are activated, the multiple screens may simultaneously be displayed in parallel on the display apparatus. In the example illustrated in FIG. 3, the display apparatus displays the following three screens in parallel, the main screen 31, the collation screen 38, and the detailed screen 39. The main screen 31, the collation screen 38, and the detailed screen 39 are displayed in a modeless form. That is to say, an operator can move to another screen and operate without closing a currently-active screen.

As the foregoing describes, the main screen 31 includes the multiple buttons corresponding to the functions of the application. The "collation, reprint, inspection, and shipment completion" functions for executing the respective steps are exclusive functions, and there is no case where the functions are used simultaneously in a step. Thus, even if the collation screen, the reprint screen, the inspection screen, and the shipment completion screen are all activated, when barcode information is input, only the currently-active screen, that is, only the function that the user currently intends to use, should be set valid. On the other hand, the "detail display and device setting" functions have functions that are independent of the foregoing functions for executing the respective steps. Thus, when barcode information is input, even if the detailed screen and the device setting screen are not active, notification of the input barcode information should be provided to the detailed screen and the device setting screen.

As the foregoing describes, whether to notify a screen of barcode information needs to be determined according to the purpose of use of the screen. Thus, in the present exemplary embodiment, the screen management unit 10 uses two lists, the normal notification list 12 and the forced notification list 13, to manage the screen control units that are destinations of notification of barcode information. Barcode information may be displayed on a screen that is notified of the barcode information.

Figure 4:
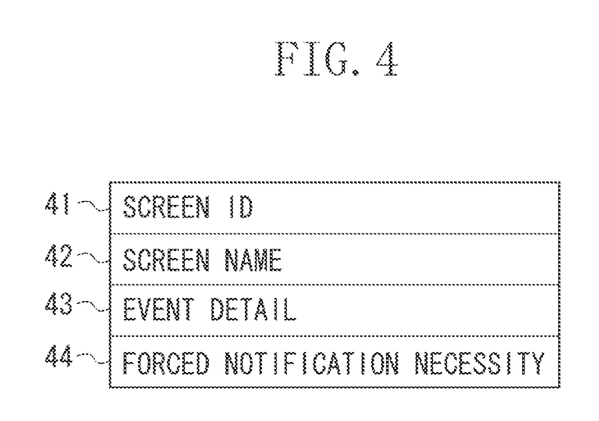
FIG. 4 illustrates a structure of information of which a screen management unit is notified.

FIG. 4 illustrates an example of the structure of information of which the screen management unit 10 is to be notified when an event of each screen of the information processing apparatus 1 occurs. The information of which the screen management unit 10 is to be notified at this time includes a screen identification (ID) 41, a screen name 42, an event detail 43, and forced notification necessity 44.

The screen ID 41 indicates an identifier for uniquely identifying the multiple screens displayed by the information processing apparatus 1. The screen name 42 indicates a name corresponding to the screen ID 41. It is desirable to adopt, as the screen name 42, a name from which the function of the screen can intuitively be understood, such as "collation screen" or "reprint screen."

The event detail 43 indicates details of an event that is caused by the subject screen. The event detail 43 includes any one of three types of events, "active," "inactive," and "close."

The event "active" indicates that the state is changed to a state in which the control of the screen is focused. In general, this state (event) occurs when the screen is opened or when the user clicks with the mouse the screen that is already opened and is in an inactive state.

The event "inactive" indicates that the state is changed to a state in which, on the contrary to the event "active," the control of the screen is not focused. This state (event) occurs when the user clicks with the mouse a screen other than the currently-active screen.

The event "close" indicates that the state is changed to a state in which the screen is closed. This state (event) occurs when the user presses a close button of the screen or the like.

In the case where a screen is closed, a previous screen that had been in the active state immediately before the closed screen becomes active.

In the example illustrated in FIG. 3, when one screen is in the active state, the remaining screens are in the inactive state.

The forced notification necessity 44 is information that indicates whether the screen in which an event occurs is a screen to which forced notification is to be provided. As the forced notification necessity 44, there are two states, "necessary" and "unnecessary." In a case where the forced notification necessity 44 is "necessary," the screen management unit 10 determines that the screen in which the event occurs is a screen to which forced notification is to be provided. Then, the screen management unit 10 uses the forced notification list 13 to manage notification of barcode information to the screen in which the event occurs. On the other hand, in a case where the forced notification necessity 44 is "unnecessary," the screen management unit 10 determines that the screen in which the event occurs is a screen to which normal notification is to be provided. Then, the screen management unit 10 uses the normal notification list 12 to manage notification of barcode information to the screen in which the event occurs. The forced notification necessity 44 of each screen is set to "necessary" or "unnecessary" in advance.

Figure 5:
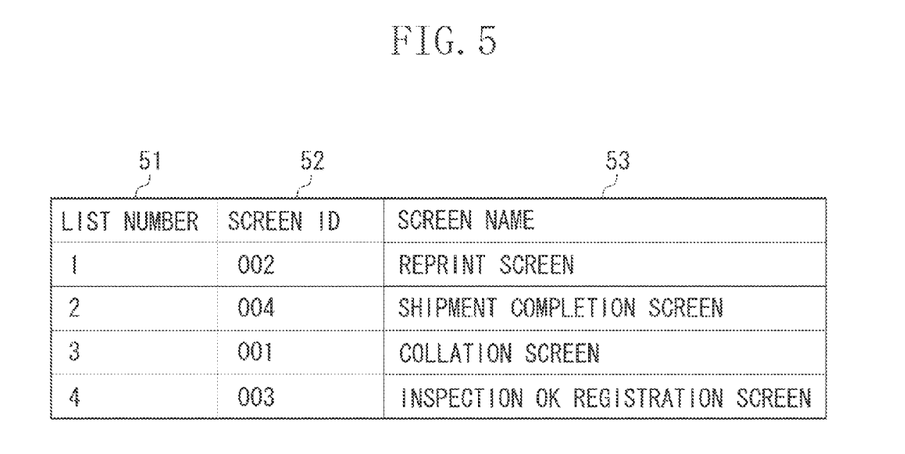
FIG. 5 illustrates an example of a structure that applies to a normal notification list and to a forced notification list.

FIG. 5 illustrates an example of a structure that applies to the normal notification list 12 and the forced notification list 13, which are managed by the screen management unit 10. A list number 51, a screen ID 52, and a screen name 53 are associated with one another and registered.

The list number 51 is a number that indicates an order in the list. The list number 51 is assigned in numerical order from the top of the list. Based on the list number 51, the order of the screens in the list can be managed. The list number 51 is associated with the screen ID 52 and the screen name 53. The screen ID 52 and the screen name 53 respectively have the same meanings as those of the screen ID 41 and screen name 42, which have been described above with reference to FIG. 4. When the screen management unit 10 is notified of an event by a screen, the screen ID 41 and the screen name 42 of the screen are respectively registered in the columns of the screen ID 52 and the screen name 53 of either the normal notification list 12 or the forced notification list 13. Details of the registration in the lists will be described below with reference to FIGS. 6 and 7, and the like.

Figure 6:
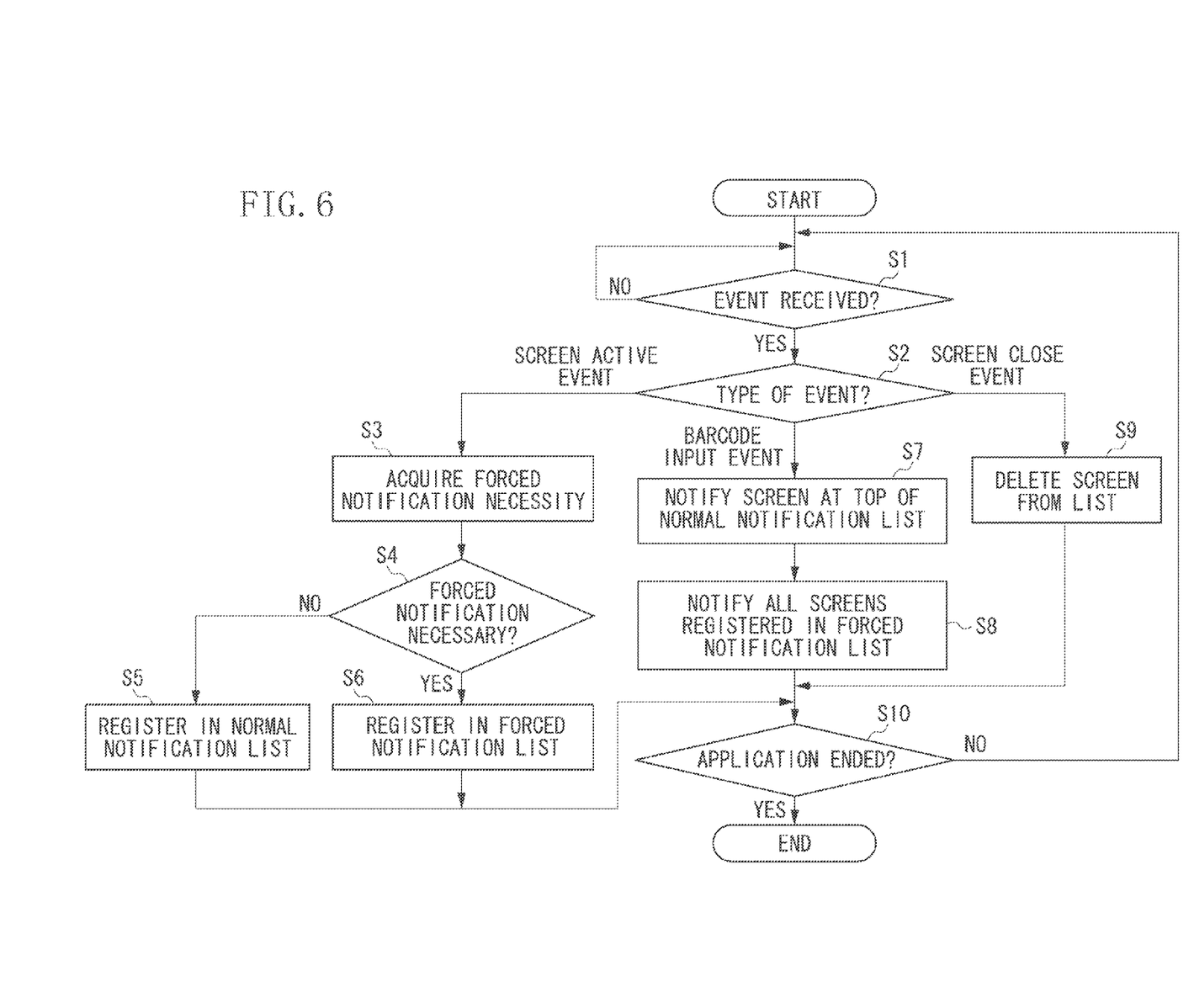
FIG. 6 is a flow chart illustrating a first example of processing executed by a screen management unit.

The following will describe an example of a series of processes performed by the screen management unit 10, with reference to the flow chart illustrated in FIG. 6.

First, in step S1, the screen management unit 10 stands by until the screen management unit 10 receives an event from each screen control unit or the input receiving unit 11. If the screen management unit 10 receives an event (YES in step S1), the processing proceeds to step S2, and the screen management unit 10 determines the type of the received event. Specifically, the screen management unit 10 initially determines whether the received event is an event regarding a screen or an event from the input receiving unit 11. As a result of the determination, if the received event is an event from the input receiving unit 11, the screen management unit 10 determines that the received event is a barcode input event.

On the other hand, if the received event is an event regarding a screen, the screen management unit 10 determines the type of the event of the screen from the event detail 43 included in the information received from the input receiving unit 11.

As a result of the determination, if the type of the event is "active" ("SCREEN ACTIVE EVENT" in step S2), the processing proceeds to step S3. In step S3, the screen management unit 10 acquires the forced notification necessity 44 included in the information received from the input receiving unit 11. Then, in step S4, the screen management unit 10 determines whether the forced notification necessity 44 is "necessary" or "unnecessary."

As a result of the determination, if the forced notification necessity 44 is "unnecessary" (NO in step S4), the processing proceeds to step S5, and the screen management unit 10 registers at the top of the normal notification list 12 (the column with the list number 51 of "1") the screen in which the event occurs. In this case, the order of each screen that is already registered is moved down by one on the list. On the other hand, if the forced notification necessity 44 is "necessary" (YES in step S4), the processing proceeds to step S6, and the screen management unit 10 registers in the forced notification list 13 the screen in which the event occurs.

At the time of the registration in the normal notification list 12 in step S5, if a screen with the same screen ID 52 is already registered in the normal notification list 12, the screen ID and the screen name of the screen in which the event occurs are moved to the top of the normal notification list 12. In this case, the order of each screen listed above the screen in which the event occurs is moved down by one on the list. On the other hand, at the time of the registration in the forced notification list 13 in step S6, if a screen with the same screen ID 52 is already registered in the forced notification list 13, new registration of the screen ID and the screen name of the screen in which the event occurs is not conducted (no processing is executed in particular).

In step S2, if the received event is a barcode input event (an event from the input receiving unit 11) ("BARCODE INPUT EVENT" in step S2), the processing proceeds to step S7. In step S7, the screen management unit 10 acquires the screen ID 52 registered at the top of the normal notification list 12, and provides notification of the barcode information to the screen control unit identified by the acquired screen ID 52. However, in a case where the screen registered at the top of the normal notification list 12 is in the inactive state, the screen management unit 10 does not acquire the screen ID 52 at the top of the normal notification list 12, and does not provide notification of the barcode information to the screen control unit identified by the screen ID 52.

Next, in step S8, the screen management unit 10 provides notification of the barcode information to screen control units of all the screens registered in the forced notification list 13. Each of the screen control units having received the notification of the barcode information executes its function. At this time, each of the screen control units produces different sounds according to the status of the product identified by the barcode information of which the screen control unit 10 is notified. For example, the sound to be produced in a case where the barcode information of which the screen control unit 10 is notified is successfully input can be different from the sound to be produced in a case where the barcode information of which the screen control unit 10 is notified fails to be input.

Examples of the case where the barcode information fails to be input are as follows. One example is a case where the barcode information fails to be read (a case where the barcode is not read appropriately). Another example is a case where the product identified by the barcode information is not managed by the workflow system. Yet another example is a case where the product identified by the barcode information is managed by the workflow system but the product is under a step that is different from the step controlled by the screen control unit notified of the barcode information. Yet another example is a case where the barcode information fails to be read. Different sounds may be produced in the respective cases. Alternatively, the sound produced in a case where the collation of the product identified by the barcode information is OK on the collation screen 38 (a case where the components of the product are right components) may be different from the sound produced in a case where the collation is not OK (a case where the collation is NG).

In the foregoing way, the user can intuitively determine the execution results of the respective functions that are obtained by reading the barcodes.

In step S2, if the type of the event is "close" ("SCREEN CLOSE EVENT" in step S2), the processing proceeds to step S9. In step S9, the screen management unit 10 deletes from the normal notification list 12 or the forced notification list 13 the screen ID 52 and the screen name 53 of the screen in which the event occurs. In this case, the order of each screen listed below the screen in which the event occurs is moved up by one on the list. As described above, no notification of the input barcode information is provided to the screen that is not opened.

After the foregoing processing, in step S10, the screen management unit 10 determines whether the application is ended. As a result of the determination, if the application is ended (YES in step S10), the processing illustrated in the flow chart in FIG. 6 ends. On the other hand, if the application is not ended (NO in step S10), the processing returns to step S1, and the screen management unit 10 stands by until the screen management unit 10 receives a next event. Whether the application is ended is determined based on whether a predetermined operation of instructing the termination of the application is performed.

Figure 7:
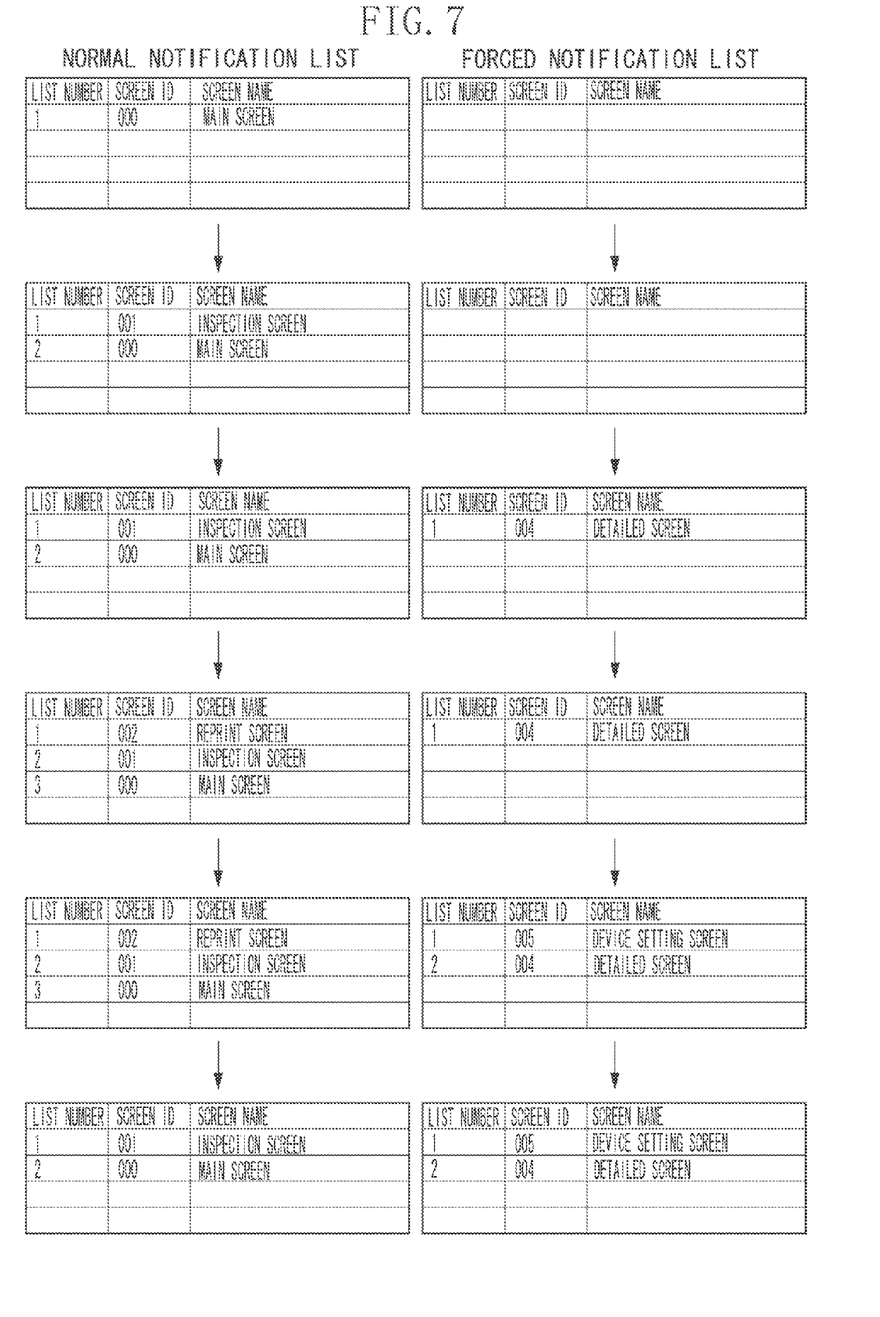
FIG. 7 illustrates transitions of a normal notification list and a forced notification list.

FIG. 7 illustrates examples of the transitions of the normal notification list 12 and the forced notification list 13. In the present exemplary embodiment, a case where the application is operated in the order specified below will be described as an example. For the detailed screen and the device setting screen, the forced notification necessity 44 is set to "necessary," and for the remaining screens, the forced notification necessity 44 is set to "unnecessary," for the reason described above.

Operation 1: Activate the application.
Operation 2: Open the inspection screen.
Operation 3: Open the detailed screen.
Operation 4: Open the reprint screen.
Operation 5: Open the device setting screen.
Operation 6: Focus on the reprint screen.
Operation 7: Input a barcode.
Operation 8: Close the reprint screen.

First, when the application is activated (when the operation 1 is performed), the main screen 31 is automatically activated. Thus, information (screen ID and screen name) on the main screen 31, for which the forced notification necessity is set to "unnecessary," is registered at the top of the normal notification list 12 (refer to the uppermost normal notification list in FIG. 7). On the other hand, the forced notification list 13 is empty (refer to the uppermost forced notification list in FIG. 7).

Next, when the user presses the inspection OK registration button 34a or the inspection NG registration button 34b on the main screen 31 (when the operation 2 is performed), the inspection screen control unit 6 activates the inspection screen. When the inspection screen control unit 6 notifies the screen management unit 10 that the inspection screen becomes active, the screen management unit 10 determines that the forced notification necessity is set to "unnecessary" for the inspection screen. Then, the screen management unit 10 registers the information on the inspection screen at the top of the normal notification list 12. As a result, the main screen 31 is moved to the second top in the normal notification list 12 (refer to the second normal notification list from the top in FIG. 7). On the other hand, the forced notification list 13 remains in the empty state (refer to the second forced notification list from the top in FIG. 7).

Next, when the user presses the detail button 36 on the main screen 31 (when the operation 3 is performed), the detailed screen control unit 8 activates the detailed screen 39. When the detailed screen control unit 8 notifies the screen management unit 10 that the detailed screen 39 becomes active, the screen management unit 10 determines that the forced notification necessity is set to "necessary" for the detailed screen. Then, the screen management unit 10 registers the information on the detailed screen in the forced notification list 13 (refer to the third forced notification list from the top in FIG. 7). On the other hand, the normal notification list 12 does not change (refer to the third normal notification list from the top in FIG. 7).

Next, when the user presses the reprint button 33 on the main screen 31 (when the operation 4 is performed), the reprint screen control unit 5 activates the reprint screen. When the reprint screen control unit 5 notifies the screen management unit 10 that the reprint screen becomes active, the screen management unit 10 determines that the forced notification necessity is set to "unnecessary" for the reprint screen. Then, the screen management unit 10 registers the information on the reprint screen at the top of the normal notification list 12. As a result, the inspection screen and the main screen 31 are respectively moved to the second and the third rows of the normal notification list 12 (refer to the fourth normal notification list from the top in FIG. 7). On the other hand, the forced notification list 13 does not change (refer to the fourth forced notification list from the top in FIG. 7).

Next, when the user presses the device setting button 37 on the main screen 31 (when the operation 5 is performed), the device setting screen control unit 9 activates the device setting screen. When the device setting screen control unit 9 notifies the screen management unit 10 that the device setting screen becomes active, the screen management unit 10 determines that the forced notification necessity is set to "necessary" for the device setting screen. Then, the screen management unit 10 registers the information on the device setting screen in the forced notification list 13 (refer to the fifth forced notification list from the top in FIG. 7). On the other hand, the normal notification list 12 does not change (refer to the fifth normal notification list from the top in FIG. 7).

While the information on the device setting screen is registered at the top of the forced notification list 13 in FIG. 7, if barcode information is input, notification of the input barcode information is provided to all screens registered in the forced notification list 13, as described above with regard to step S8. Thus, the registration order (list order) of the screens in the forced notification list 13 are not specified.

Next, when the user focuses on the reprint screen activated in the operation 4 (when the operation 6 is performed), the reprint screen control unit 5 notifies the screen management unit 10 that the reprint screen becomes active. However, since the information on the reprint screen is already registered in the normal notification list 12, the information on the reprint screen is not newly added to the normal notification list 12. Further, since the information on the reprint screen is registered at the top of the normal notification list 12, the processing of moving the information on the reprint screen to the top of the normal notification list 12 is not performed. Accordingly, the state of the normal notification list 12 after the operation 6 is completed does not change (from the fifth normal notification list from the top in FIG. 7).

Then, the user reads the barcode with the input apparatus 2 (barcode reader) (the operation 7 is performed). At this time, notification of the event that barcode information is read (barcode input event) is provided to the screen management unit 10 via the input receiving unit 11. The screen management unit 10 having received the barcode input event provides notification of the barcode information to the screen control unit of the screen registered at the top of the normal notification list 12 among the two lists. In other words, the screen management unit 10 notifies the reprint screen control unit 5 of the barcode information. Based on the notification, the reprint screen control unit 5 displays the barcode information on the reprint screen.

Further, the screen management unit 10 does not provide notification of the barcode information to the screen control units (the inspection screen control unit 6 and the main screen control unit 3) of the inspection screen and the main screen that are registered in the second and the third rows, respectively, in the normal notification list 12. Thus, although the inspection screen and the main screen are in the open state, even if a barcode is read, the inspection screen and the main screen (user interfaces) do not change.

Further, the screen management unit 10 provides notification of the barcode information to the screen control units of all the screens registered in the forced notification list 13. That is to say, the screen management unit 10 provides notification of the barcode information to the detailed screen control unit 8 and the device setting screen control unit 9. Based on the notification, the detailed screen control unit 8 and the device setting screen control unit 9 display the barcode information on the detailed screen and the device setting screen, respectively. Although the detailed screen and the device setting screen are in the inactive state, since the detailed screen and the device setting screen are determined as screens to which the forced notification is to be provided, notification of the barcode information is provided to the detailed screen and the device setting screen. Especially, although the detailed screen is a screen activated prior to the device setting screen, the detailed screen is notified of the barcode information because the detailed screen is determined as the screen to which forced notification is to be provided.

Lastly, when the user performs an operation of closing the reprint screen (when the operation 8 is performed), the reprint screen control unit 5 notifies the screen management unit 10 of the event that the reprint screen is closed (screen close event). At this timing, the screen management unit 10 deletes the registration of the reprint screen from the normal notification list 12 in which the information on the reprint screen is registered. Consequently, the information on the inspection screen is registered at the top of the normal notification list 12, and the information on the main screen is registered at the second row (refer to the lowermost normal notification list in FIG. 7). On the other hand, the forced notification list 13 does not change (refer to the lowermost forced notification list 13 in FIG. 7). In a case where barcode information is input again in the state in which the operation 8 is completed, since the inspection screen is in the inactive state (the device setting screen is in the active state), the screen management unit 10 does not notify the inspection screen control unit 6 of the barcode information.

Figure 8:
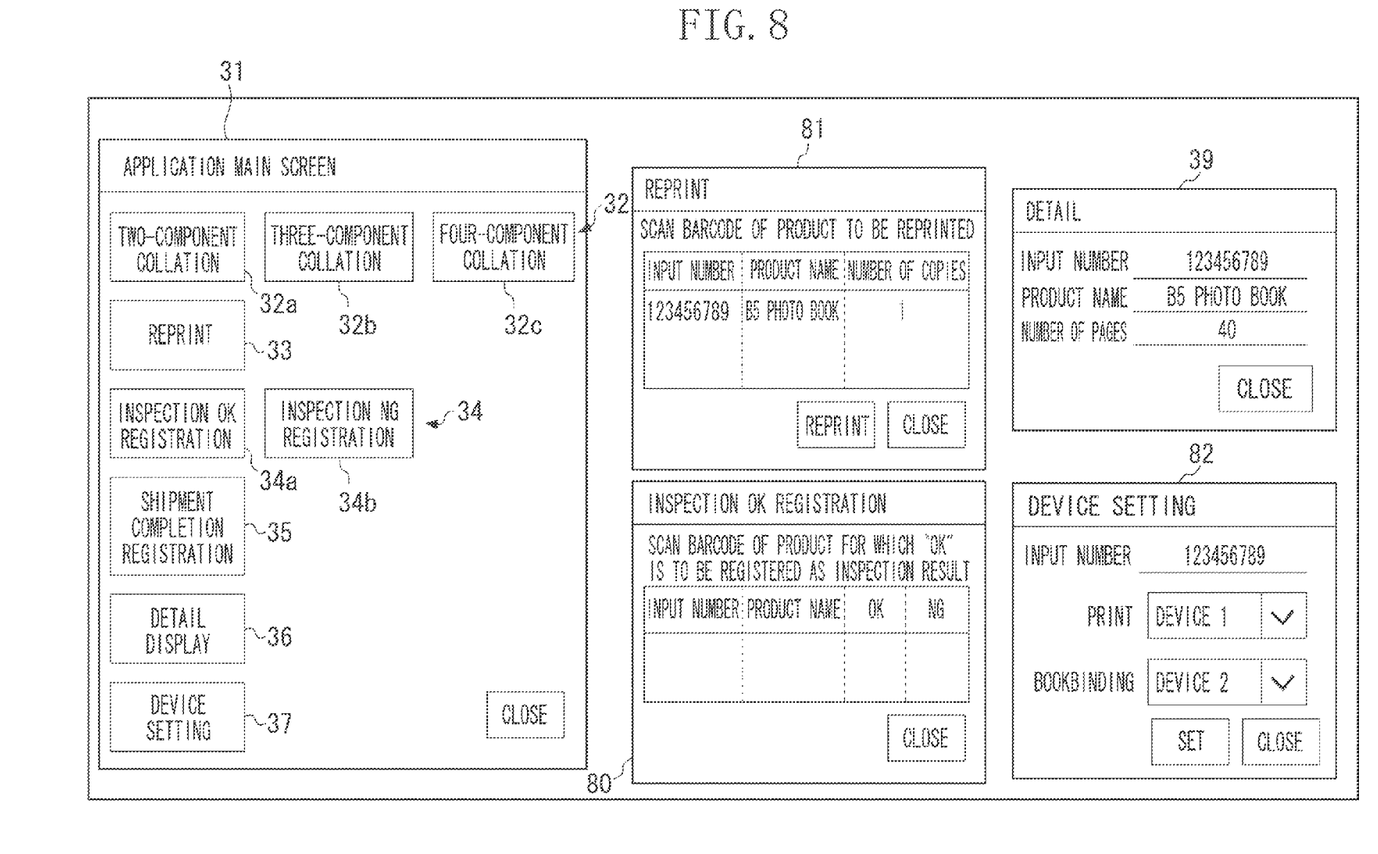
FIG. 8 illustrates a second example of a state of a user interface of an information processing apparatus.

FIG. 8 illustrates examples of the states of user interfaces of the information processing apparatus 1 after the completion of the operation 7 described above.

As illustrated in FIG. 8, the main screen 31, the inspection screen 80, the detailed screen 39, the reprint screen 81, and the device setting screen 82 are simultaneously displayed on the display apparatus as a result of the execution of the operations 1 to 5. These screens are displayed in a modeless form as described above with regard to FIG. 3. In this state, a barcode indicating the number "123456789" is read in the operation 7. As described above with regard to steps S7 and S8 in FIG. 6, notification of the barcode information is provided to the screen control unit of the screen registered at the top of the normal notification list 12 and the screen control units of all the screens registered in the forced notification list 13.

Before the operation 7 is performed, the normal notification list 12 and the forced notification list 13 are respectively in the second states from the bottom in FIG. 7. Thus, the product corresponding to the number "123456789" is displayed, as an object to be reprinted, on the reprint screen 81 registered at the top of the normal notification list 12. On the other hand, notification of the barcode information is not provided to the screen control units (the inspection screen control unit 6 and the main screen control unit 3) of the inspection screen 80 and the main screen 31, which are not registered at the top of the normal notification list 12. Thus, the read barcode information is not displayed on the inspection screen 80 and the main screen 31. Furthermore, the functions of the workflows corresponding to the inspection screen 80 and the main screen 31 are not executed. Further, notification of the barcode information is provided to the screen control units (the detailed screen control unit 8 and the device setting screen control unit 9) of the detailed screen 39 and the device setting screen 82, which are registered in the forced notification list 13. Thus, the number "123456789" is displayed in the field "input number" on each of the detailed screen 39 and the device setting screen 82, so that the user can check the detailed information and perform the device settings.

In some cases, all the screens of the application may be in the inactive state (in the example illustrated in FIG. 8, the main screen 31, the detailed screen 39, the inspection screen 80, the reprint screen 81, and the device setting screen 82 are inactive) at the time when the barcode information is input. One example is a case where a screen of another application is in an active state. In this case, for example, the screen management unit 10 can provide error notification to the main screen control unit 3 and all or some of the screen control units to which notification of the barcode information is to be provided. In this way, the screen control unit having received the error notification can display on the screen controlled by the screen control unit a message indicating that the function specified by the read barcode cannot be executed, a message that prompts the user to read the barcode again, or the like. The screen management unit 10 may display such a message on the foremost surface of the display apparatus.

As described above, in the present exemplary embodiment, when barcode information is input while multiple screens are activated, notification of the barcode information is provided to both of the screen registered at the top of the normal notification list 12 and all screens registered in the forced notification list 13. In this way, the screens are registered in the two lists, the normal notification list 12 and the forced notification list 13, to control the screens where the barcode information is displayed, whereby appropriate notification can be provided according to the functions and states of activated screens. In the example case described above, since the purpose of the inspection screen activated in the operation 2 is registration, the inspection screen has a function of registering the inspection at the time when the barcode is read. Thus, if notification of the barcode information is provided to all screens as in the conventional technique described above, the inspection registration processing is executed if the screens are opened although the screens are not active. Even in this case, it is possible to control the function of a screen such that the function is executed only when the screen is active. This is effective in improving the usability and operation efficiency. Furthermore, execution of an operation that is not intended by the user can be prevented.

In the present exemplary embodiment, in the case where the screen registered at the top of the normal notification list 12 is in the inactive state, notification of the barcode information is not provided to the screen. This, however, is not a limiting case. For example, notification of the barcode information may be provided to the screen registered at the top of the normal notification list 12 regardless of the state of the screen. Further, notification of the barcode information may be provided to the screens other than the screen registered at the top of the normal notification list 12 regardless of the states of the screens. For example, the barcode information may be displayed on up to the n-th screen (n is an integer of 2 or greater) from the top of the normal notification list 12. Further, for each of the screens registered in the normal notification list 12, the time elapsed since the screen had changed to the active state may be managed, and notification of the barcode information may be provided to a screen with the elapsed time equal to or shorter than a predetermined value. In this way, the normal notification list 12 can be used as a list for managing the screens that are in the active state and the screens that are in the inactive state and satisfy a predetermined notification condition. Even in this case, the forced notification list 13 is a list for managing the screens to which notification of barcode information is to be provided unconditionally.

In a second exemplary embodiment, in a case where a screen of another application is active at the time when barcode information is input, whether to provide notification of the barcode information to a screen control unit of a screen of an application that is in an inactive state is set. In a case where notification of the barcode information is set to be provided, notification of the barcode information is provided as in the first exemplary embodiment. A main difference between the present exemplary embodiment and the first exemplary embodiment lies in the processing to be executed in the case where a screen of another application is active at the time when barcode information is input. Thus, in the following description of the present exemplary embodiment, components that are similar to those in the first exemplary embodiment are given the same reference numerals as those specified in FIGS. 1 to 8, and detailed description thereof will be omitted.

As described below, in a case where, for example, the operation 6 described above is an operation of activating another application instead of focusing on the reprint screen, the application that had been active becomes inactive.

Operation 1: Activate the application.
Operation 2: Open the inspection screen.
Operation 3: Open the detailed screen.
Operation 4: Open the reprint screen.
Operation 5: Open the device setting screen.
Operation 6: Activate another application.
Operation 7: Input a barcode.
Operation 8: Close the reprint screen.

Figure 9:
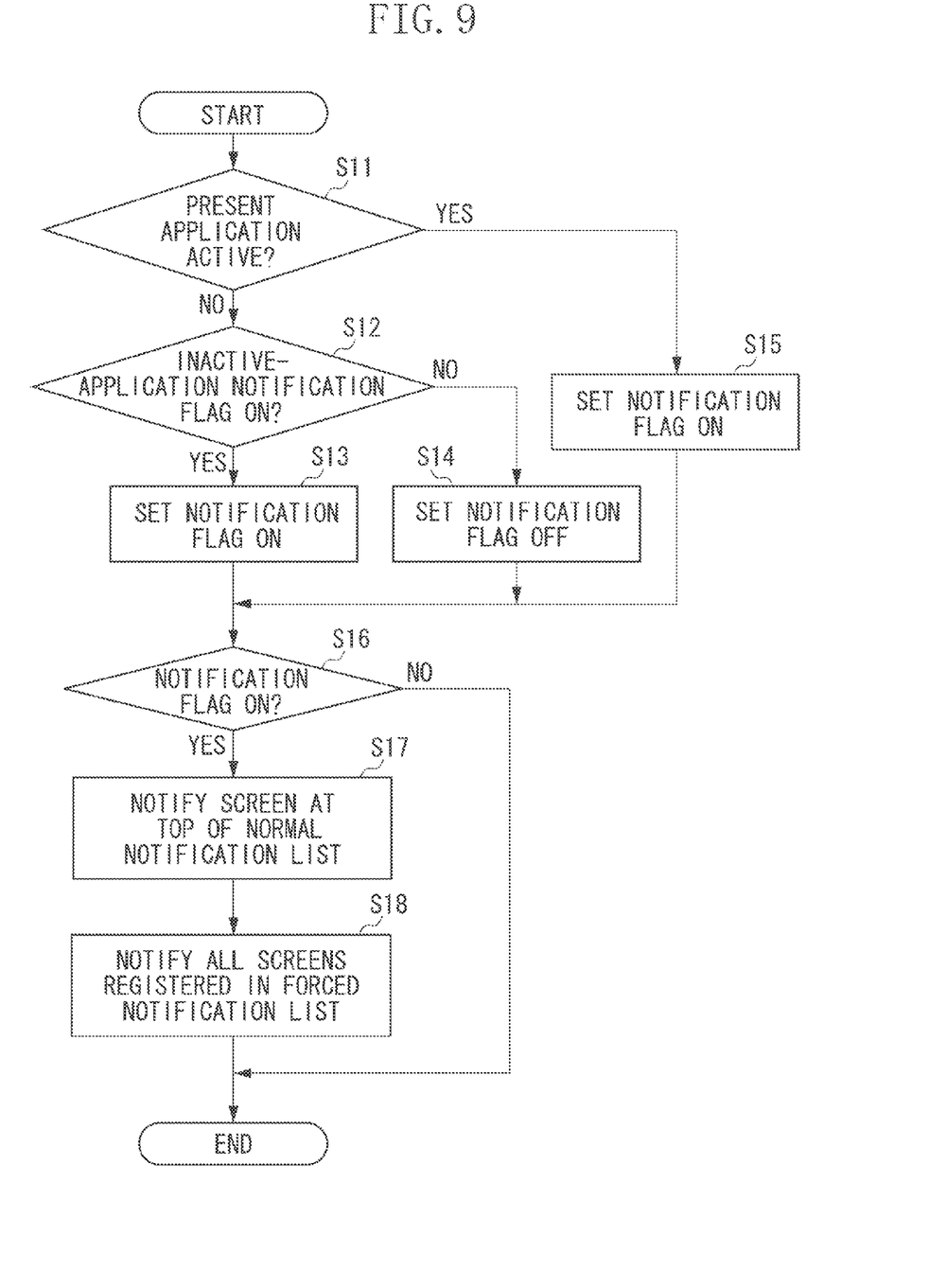
FIG. 9 is a flow chart illustrating a second example of processing executed by a screen management unit.

The following will describe an example of a series of processes executed by the screen management unit 10 in the case where the type of the received event is the barcode input event, with reference to a flow chart illustrated in FIG. 9. The flow chart illustrated in FIG. 9 is executed in place of, for example, steps S7 and S8 in FIG. 6. In the following description, an application that executes the function of the workflow by the input of barcode information (an application that displays screens as illustrated in FIG. 3 or 8 in the first exemplary embodiment) will be referred to as the present application as necessary.

First, in step S11, the screen management unit 10 determines whether the present application is active (whether any one of the screens of the present application is active). As a result of the determination, if the present application itself is active (YES in step S11), the processing proceeds to step S15, and the screen management unit 10 sets a notification flag managed inside the screen management unit 10 to ON. The notification flag is a flag that indicates whether to execute the processes corresponding to steps S7 and S8 in FIG. 6. The notification flag that is ON indicates that the processes are executed, whereas the notification flag that is OFF indicates that the processes are not executed. Then, the processing proceeds to step S16, which will be described below.

On the other hand, if the present application itself is not active (if all screens of the present application are inactive) (NO in step S11), the processing proceeds to step S12, and the screen management unit 10 determines whether an inactive-application notification flag is ON. The inactive-application notification flag is a flag that indicates whether to provide notification of the barcode information to the screen control unit of the screen registered at the top of the normal notification list 12 and the screen control units of the screens registered in the forced notification list 13 even when the application is inactive. In a case where the inactive-application notification flag is ON, notification of the barcode information is provided. In a case where the inactive-application notification flag is OFF, notification of the barcode information is not provided. The inactive-application notification flag can be set in advance, for example, at the time of activation of the present application. The inactive-application notification flag may be a value that is fixed for the application or may be configured to be editable with a setting file or the like so that the user can change the value. If the inactive-application notification flag is ON (YES in step S12), the processing proceeds to step S13, and the screen management unit 10 sets the notification flag to ON. On the other hand, if the inactive-application notification flag is OFF (NO in step S12), the processing proceeds to step S14, and the screen management unit 10 sets the notification flag to OFF.

Next, the processing proceeds to step S16, and the screen management unit 10 determines the state of the notification flag determined in step S13, S14, or S15. As a result of the determination, if the notification flag is ON (YES in step S16), the processes in steps S17 and S18 are carried out. The processes in steps S17 and S18 are similar to those in steps S7 and S8 in FIG. 6, respectively, so detailed description of steps S17 and S18 will be omitted.

On the other hand, if the notification flag is OFF (NO in step S16), notification of the barcode information is not provided to the screen control unit of the screen registered at the top of the normal notification list 12 and the screen control units of the screens registered in the forced notification list 13. Thus, the processing of the flow chart in FIG. 9 ends without carrying out the processes in steps S17 and S18.

As the foregoing describes, in the present exemplary embodiment, even in the case where barcode information is input while the present application is inactive, whether to provide notification of the barcode information to a screen control unit of a screen of the present application can be changed based on the user settings.

One example of a use case in which notification of barcode information is provided to a screen control unit even when the present application is inactive is a case where the user desires to input a barcode while another application is activated.

For example, when the user inputs barcode information, the user may search for and check the information from a list of documents opened in another application. In this case, if notification of the barcode information is set to be provided only when the present application itself is active, the user needs to repeat the operation of changing the present application to the active state and the operation of changing another application to the active state. This increases the number of clicks performed on the screens, thereby decreasing the operation efficiency accordingly. Thus, notification of the input barcode information is set to be provided to a screen control unit of the present application even when the present application itself is inactive, whereby the use case can be executed without decreasing the operation efficiency.

Further, one example of a use case in which notification of barcode information to a screen is not desired when the present application is inactive is a case where the present application is inactive because the present application is currently not in use, and no input to a screen of the present application is desired.

Accordingly, the settings are changed according to a use case of the user as described above to enable uses corresponding to multiple use cases.

It is to be understood that the foregoing exemplary embodiments are mere examples of implementation of the present invention, and are not to be construed as liming the technical scope of the present invention. In other words, the present invention can be implemented in various forms without departing from the technical thought or main features of the present invention.

According the exemplary embodiments described above, input information can be displayed on a screen on which the input information should be displayed among multiple screens provided from an application.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-003357 filed Jan. 10, 2014, which is hereby incorporated by reference herein in its entirety.

What is claimed is:

1. An information processing apparatus comprising:
   at least one processor;
   a providing unit configured to provide, from an application, at least a first screen, which is managed as a screen for forced notification, and a second screen, which is managed as a screen for non-forced notification;
   an input unit configured to input information to be displayed in a screen;
   a notification control unit configured to notify a screen of the information,
   wherein, in a case where the second screen is in an active state as a screen registered at a predetermined position in a list, the notification control unit is configured to notify the second screen of the information,
   wherein, in a case where the second screen is in an inactive state, the notification control unit is configured not to notify the second screen of the information, and to notify the first screen of the information regardless of whether the first screen is in an active state or an inactive state, and
   wherein the at least one processor implements the providing unit, the input unit, and the notification control unit.

2. The information processing apparatus according to claim 1, further comprising a management unit configured to manage a plurality of screens, including the first screen provided from the application, as screens for the forced notification,
   wherein the notification control unit notifies of the information to all of the screens managed as screens for the forced notification.

3. The information processing apparatus according to claim 1, further comprising:
   a setting unit configured to set, in advance, whether to display the information on a screen provided from the application when the application is in an inactive state; and
   a determination unit configured to determine, in a case where the information is input when the application is in an inactive state, whether the information is set by the setting unit to be displayed,
   wherein, in a case where it is determined by the determination unit that the information is not set to be displayed, the notification control unit notifies neither the first screen nor the second screen of the information.

4. The information processing apparatus according to claim 3, further comprising a management unit configured to manage a plurality of screens, including the second screen provided from the application, as screens for non-forced notification,
   wherein, in a case where it is determined by the determination unit that the information is set to be displayed, the notification control unit notifies the information to screens managed as screens for the forced notification, and notifies the information to a screen that is changed to an active state last among the screens managed as screens for the non-forced notification.

5. The information processing apparatus according to claim 1, wherein the information is coded information printed on a sheet, and wherein the input unit inputs the information optically read from the sheet.

6. The information processing apparatus according to claim 1, wherein the information includes information for identifying a product constituted using a sheet, and wherein screens provided from the application includes a screen for managing production of the product.

7. An information processing method to be executed by at least one processor and for an information processing apparatus having a notification control unit configured to notify a screen of information, the information processing method comprising:
providing from an application, at least a first screen, which is managed as a screen for forced notification, and a second screen, which is managed as a screen for non-forced notification; and
inputting information to be displayed in a screen,
wherein, in a case where the second screen is in an active state as a screen registered at a predetermined position in a list, the notification control unit notifies the second screen of the information, and
wherein, in a case where the second screen is in an inactive state, the notification control unit does not notify the second screen of the information, and notifies the first screen of the information regardless of whether the first screen is in an active state or an inactive state.

8. The information processing method according to claim 7, further comprising managing a plurality of screens, including the first screen provided from the application, as screens for the forced notification,
wherein the notification control unit notifies of the information to all of the screens managed as screens for the forced notification.

9. The information processing method according to claim 7, further comprising:
setting, in advance, whether to display the information on a screen provided from the application when the application is in an inactive state; and
determining, in a case where the information is input when the application is in an inactive state, whether the information is set to be displayed,
wherein, in a case where it is determined that the information is not set to be displayed, the notification control unit notifies neither the first screen nor the second screen of the information.

10. The information processing method according to claim 7, further comprising managing a plurality of screens, including the second screen provided from the application, as screens for non-forced notification,
wherein, in a case where it is determined that the information is set to be displayed, the notification control unit notifies the information to screens managed as screens for the forced notification, and notifies the information to a screen that is changed to an active state last among the screens managed as screens for the non-forced notification.

11. The information processing method according to claim 7, wherein the information is coded information printed on a sheet, and wherein inputting includes inputting the information optically read from the sheet.

12. The information processing method according to claim 7, wherein the information includes information for identifying a product constituted using a sheet, and wherein screens provided from the application includes a screen for managing production of the product.

13. A non-transitory computer-readable storage medium storing a program executable by at least one processor and to cause an information processing apparatus, having a notification control unit configured to notify a screen of information, to perform an information processing method, the information processing method comprising:
providing, from an application, at least a first screen, which is managed as a screen for forced notification, and a second screen, which is managed as a screen for non-forced notification; and
inputting information to be displayed in a screen,
wherein, in a case where the second screen is in an active state as a screen registered at a predetermined position in a list, the notification control unit notifies the second screen of the information, and
wherein, in a case where the second screen is in an inactive state, the notification control unit does not notify the second screen of the information, and notifies the first screen of the information regardless of whether the first screen is in an active state or an inactive state.

14. The non-transitory computer-readable storage medium according to claim 13, the information processing method further comprising managing a plurality of screens, including the first screen provided from the application, as screens for the forced notification,
wherein the notification control unit notifies of the information to all of the screens managed as screens for the forced notification.

15. The non-transitory computer-readable storage medium according to claim 13, the information processing method further comprising:
setting, in advance, whether to display the information on a screen provided from the application when the application is in an inactive state; and
determining, in a case where the information is input when the application is in an inactive state, whether the information is set to be displayed,
wherein, in a case where it is determined that the information is not set to be displayed, the notification control unit notifies neither the first screen nor the second screen of the information.

16. The non-transitory computer-readable storage medium according to claim 13, the information processing method further comprising managing a plurality of screens, including the second screen provided from the application, as screens for non-forced notification,
wherein, in a case where it is determined that the information is set to be displayed, the notification control unit notifies the information to screens managed as screens for the forced notification, and notifies the information to a screen that is changed to an active state last among the screens managed as screens for the non-forced notification.

17. The non-transitory computer-readable storage medium according to claim 13, wherein the information is coded information printed on a sheet, and wherein inputting includes inputting the information optically read from the sheet.

18. The non-transitory computer-readable storage medium according to claim 13, wherein the information includes information for identifying a product constituted using a sheet, and wherein screens provided from the application includes a screen for managing production of the product.

* * * * *